Dec. 25, 1956  J. G. A. M. J. MEYER  2,775,367
FLUID DISTRIBUTING AND METERING APPARATUS
Filed July 24, 1951  4 Sheets-Sheet 2
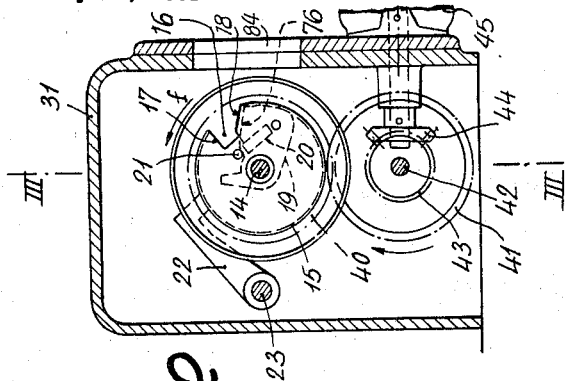
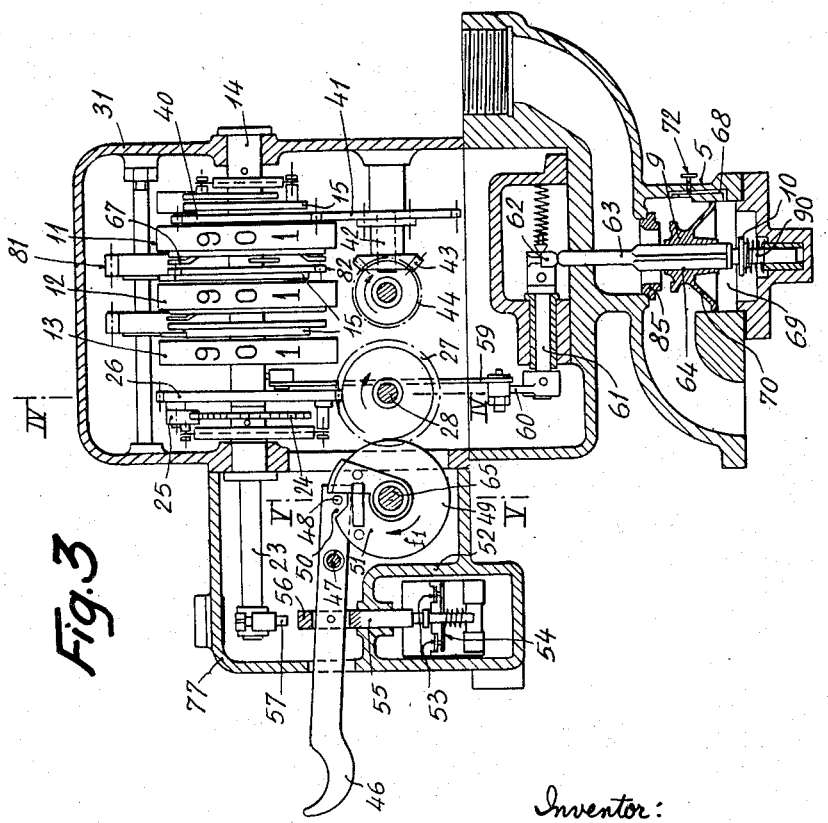
Inventor:
Jean, Gustave, Antoine, Marie, Joseph Meyer
By:

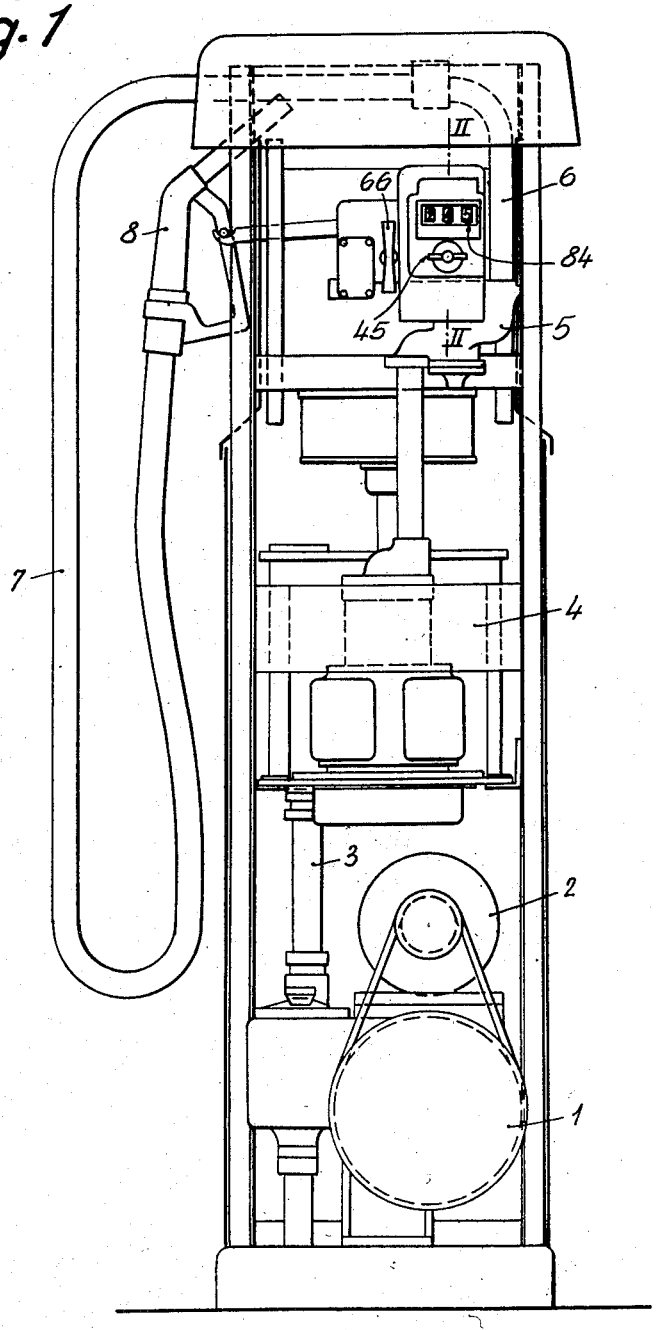

Dec. 25, 1956   J. G. A. M. J. MEYER   2,775,367
FLUID DISTRIBUTING AND METERING APPARATUS
Filed July 24, 1951   4 Sheets-Sheet 3

Inventor:
Jean, Gustave, Antoine, Marie, Joseph Meyer
By Michael Stan

United States Patent Office 2,775,367
Patented Dec. 25, 1956

2,775,367

FLUID DISTRIBUTING AND METERING APPARATUS

Jean Gustave Antoine Marie Joseph Meyer, Neuilly-sur-Seine, France, assignor to S. A. T. A. M., Societe Anonyme pour Tous Appareillages Mecaniques, La Courneuve (Seine), France, a society of France Application July 24, 1951, Serial No. 238,210

Claims priority, application France July 25, 1950

4 Claims. (Cl. 222—20)

The present invention relates to a fluid distributing and metering apparatus.

It is one object of the present invention to provide a fluid distributing and metering apparatus which can be operated by an unskilled person.

An additional object of the present invention is to construct such an apparatus of relatively few and simple parts which will perform trouble-free over a long period.

With these objects in view, the present invention mainly consists in a fluid dispensing and metering apparatus comprising, in combination, a main distributing conduit, a valve means controlling the passage of fluid through the conduit, a presetting device, means for moving the presetting device from a zero position to a preset position corresponding to the quantity of fluid to be delivered, means connecting the presetting device to the valve means and opening the valve means during movement of the presetting device to a preset position, a metering device in the main conduit means and actuated by the delivered fluid, the metering device being connected to the presetting device and moving the same from the preset position into the zero position during fluid delivery, indicating means actuated by the metering device, a shaft, means for resetting the indicating means from indicating position to zero position connected to and actuated by the shaft; a circular cam formed with a notch on its periphery and mounted on the shaft; a member turnably mounted on the shaft adjacent the cam, the member having a length slightly greater than the radius of the circular cam, resilient means attached to the cam and to the member and tending to move the member into a position covering the notch; a pivoted lever, a stud secured to the lever and located opposite the notch when the cam is in a position corresponding to the zero position of the indicating means, and located opposite the circular periphery of the cam when the indicating means are not in zero position, a pump for circulating fluid through the main conduit means, pump actuating means movable between a pump starting position and a pump stopping position, a connecting member secured to the pump actuating means and moving with the same, the connecting member being connected to the lever, spring means urging the pump actuating means into the pump starting position and also urging the lever to pivot into a position in which the stud is located on the periphery of the cam and tends to drop into the notch, a flexible hose communicating with the main conduit means, means for attaching the hose to the lever, the weight of the hose tending to pivot the lever into a position in which the stud is located outside of the notch, and means connected to and actuated by the presetting device and holding the connecting member in a position corresponding to the pump stopping position of the pump actuating means when the presetting device is in zero position.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1 is a general view of a liquid metering and distributing apparatus, in accordance with the present invention.

Figure 2 is a partial section of this apparatus along line II—II of Figure 1 viewed toward the right.

Figure 3 is a partial section of this apparatus along line III—III of Figure 2, and Figures 4 and 5 are partial sections of this apparatus, respectively along lines IV—IV and V—V of Figure 3.

Figure 2A:
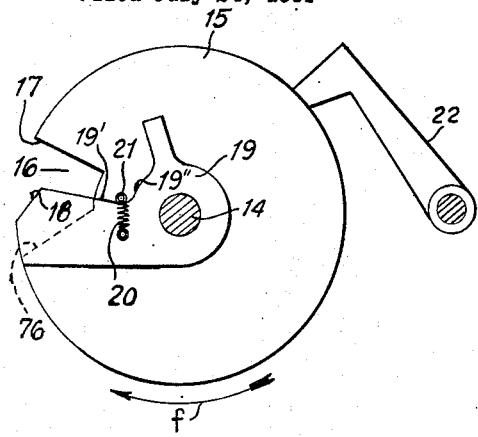
Figure 2a is a partial section of the apparatus along the lines II—II of Fig. 1 viewed toward the left and showing some of the elements illustrated in Fig. 2 to an enlarged scale.
Figure 4:
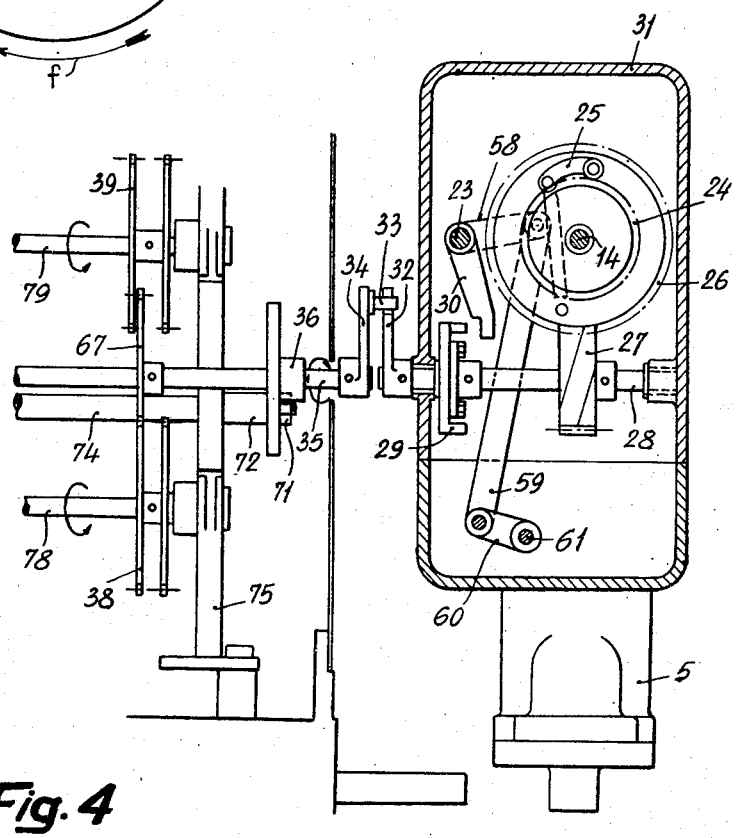

The liquid metering and distributing apparatus shown in the appended drawing comprises a pump 1, driven by a motor. This pump sucks in the liquid from a storage tank, not shown, and forces it through the pipe 3 into a separating and metering group 4. On coming out, the liquid passes into a clack box 5, thence to the distribution conduit 6 and the flexible distribution hose 7 the free end of which is provided with a distribution nozzle 8. The delivery of the apparatus is controlled, on the one hand, by a valve 9, arranged inside the clack box 5 and, on the other hand, by a valve, for instance of the type of that shown in the copending application Serial No. 591,-359 filed May 1, 1945, now abandoned, arranged in the nozzle 8 and controlled by the operator.

The position of the valve 9 is controlled by an auxiliary valve 10, itself controlled by a presetting mechanism, the latter consisting here of three drums, 11, 12 and 13, is of the type of that described in French Patent No. 808,-471, filed October 25, 1935.

The drums 12 and 13 are mounted free on the shaft 14 while the drum 11 is keyed on said shaft. Each one of these drums is associated with a cam 15 which comprises a notch 16, one side of which, 17 is substantially radial and the other side of which, 76, forms a guiding edge inclined to the radius of the cam 15 and connecting the bottom of the notch and the circular perimeter of the cam 15. A bell crank lever, 19, mounted free on one of the cams, is acted upon by a spring 20, one end of which is secured to a stud 21, placed on the side of the cam 15 and serving, at the same time as a stop for the lever 19. In this position, one arm of the lever 19 covers part of the notch 16 and projects beyond the edge 76 in such a way that the open part of the notch 16 is bounded at one side by the edge 17 and at the other side by the edge 18 of the lever 19 and the edge 19' leading in substantial radial direction from the end of the edge 18 to the base portion 19'' located between the two arms of the lever 19. In the position of lever 19 the edge 18 is less inclined with respect to the radial direction of the cam 15 than the edge 76 so that during rotation of the cam 15 opposite to the direction of arrow f (which occurs when the apparatus distributes fluid), the lever 22 slides from the periphery of cam 15 onto the peripheral edge of the lever 19 and then drops into the notch 16 more rapidly than if the lever 19 would not be provided. This cooperation between the lever 22, on one hand, and the cam 15 and the lever 19, on the other hand, can be best visualized from Fig. 2a. Only one lever 22 is shown in Fig. 2 of the drawings, but it is understood that a lever 22 is provided for each of the cams 15. These levers 22 are keyed to a shaft 23 which is parallel to the shaft 14. The levers 22 are keyed to the shaft under the same angle and are spaced from each other, respectively, distances equal to the spacing of the cams 15 on the shaft 14. Therefore, the shaft 23 may not rock except when the ends of the levers 22 are located opposite the notches 16 in the cam 15 which occurs when the drums 11, 12 and 13 show a 0 behind the window 84. A ratchet wheel 24 is keyed on the shaft 14. The number of teeth of the ratchet wheel is equal to the number of divisions on the drum 11, or equal to a multiple of this number, so that the relative positions of these ratchets and divisions are always the same. A pawl 25 is mounted rocking on the side of a worm wheel 26, mounted free on the shaft 14, and co-operates with the wheel 24. This wheel 26 meshes with a worm 27, keyed on a shaft 28. On the latter is keyed a cam 29, in the shape of a dish, the edges of which co-operate with an arm 30, keyed on the shaft 23. The three arms 22, the arm 30 and the shaft 23 form an assembly 22, 23, 30, hereinafter called a comb. The shafts 14, 23, 28 are mounted on a casing 31, on which are secured the clack box 5 and a casing 77, so as to constitute a block. The shaft 28 protrudes out of the frame 31 and, on the protruding portion of this shaft is keyed on arm 32, which can be secured by a stud 33 to an arm 34, keyed on a shaft 35. The latter rests on a bearing 36. This bearing is secured by a nut 71, screwed on the end of an extension 72, itself screwed, in turn, on the end of a cross piece 74 of the block 75, containing the indicating mechanism. A similar bearing, not shown, holds the other end of the shaft 35.

The shaft 35 carries a toothed wheel 67 which, by an axial displacement, can be put in gear either with a toothed pinion 38, associated with the shaft 78 of the liter-indicating mechanism, not shown, or with a pinion 39, associated with the shaft 79 of the price indicating mechanism, not shown.

On the shaft 14 is also keyed a toothed pinion 40, gearing with a pinion 41, keyed on a shaft 42. A conical angle pinion 43, keyed on the shaft 42 gears with another conical pinion 44, controlled by a control knob 45.

The nozzle 8 may be hooked to the hooked end of a spring-loaded lever 46, rocking about a shaft 47, carried by the frame 77 so as to depress the hooked end. The other arm of this lever carries a stud 48 which cooperates with a cam 49, of the same type as the cams 15 and comprising, like the latter a notch 50. The right-hannd edge of this notch (as viewed in Fig. 3) extends in substantial radial direction from the bottom of the notch whereas the left-hand edge of the notch forms a cam surface inclined to the cam radius passing through the intersection of this cam surface with the outer periphery of the cam. A lever 51 loosely mounted on a shaft projecting from one side of the cam 49 is biased in counterclockwise direction by means of a spring 51', one end of which is fixed to the lever 51 and the other end of which is fastened to a pin projecting laterally from the cam 49. In the position shown in Fig. 3 the lever 51 covers a portion of the notch 50 and the peripheral edge of this lever 51 forms a curve the left-hand end of which is spaced a distance from the axis of the shaft 65 larger than the radius of the cam 49, whereas the right-hand end of this curve blends with the peripheral surface of the cam 49.

Inside the casing 77 is also arranged an interrupter box 52, comprising two contact points 53 arranged on the electrical control circuit, not shown, of the pump 1. These contact points cooperate with a control bar 54, carried by a rod 55, guided by the box 52 and projecting outside thereof. Its outer end is bored with a window 56 through which the lever 46 passes.

On the other hand, as clearly shown in Fig. 3, the shaft 23 projects from the casing 31 into the casing 77. The shaft 23 carries opposite the rod 55 a lever 57. When the ends of the levers 22 have entered into the notches 16 and the lever 30 has entered into the notch of the cam 29, the lever 57 exerts pressure on the rod 55 and prevents in this manner rocking of the lever 46 in clockwise direction even if the distribution nozzle 8 is lifted from the hook 46.

On the shaft 23 is keyed an arm 58 which, through a connecting rod 59 and an arm 60, controls the rotation of a shaft 61. Another arm 62, keyed on this shaft 61 controls the stem 63 of the auxiliary valve 10, which goes through a bore 64 of the valve 9 and serves it as a pilot valve. The valve 9 is thus mounted free on this stem 63.

Figure 5:
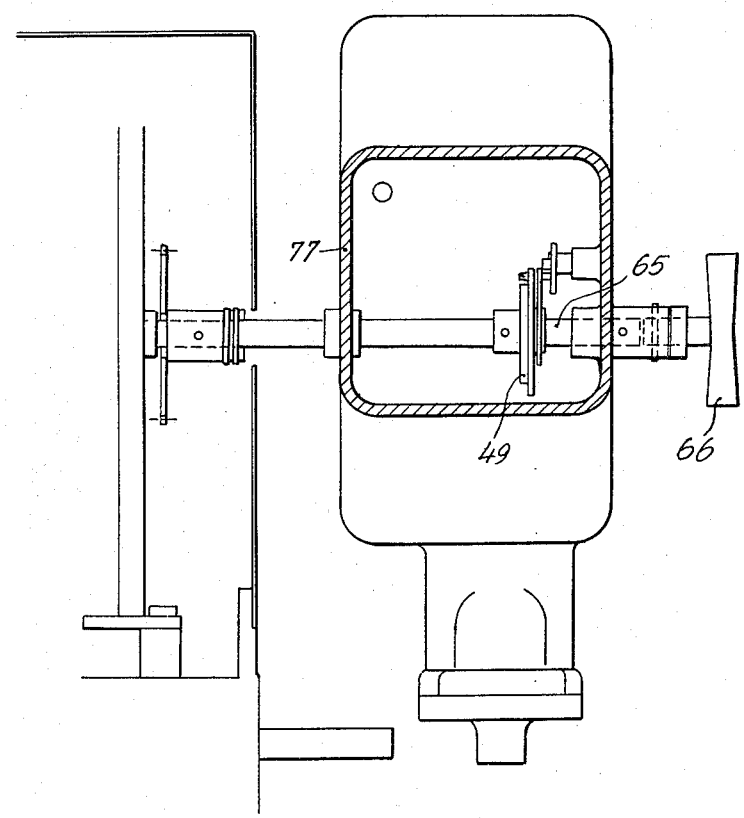

The operation of the apparatus may be as follows:

*Starting.*—The indicating mechanism is set to zero by turning the knob 66 and, consequently the shaft 65 and the cam 49 in the direction of the arrow $f_1$ (Fig. 3). Shaft 65 is connected to the indicating mechanism as shown in Fig. 5.

If the stud 48 is in the notch 50 (which is the case particularly if the nozzle handle 8 is not on the hooked end of lever 46 as is the case when the apparatus is dispensing), it slides on the inclined side of the notch 50, tipping the lever 46 which pushes rod 55 downwardly and disconnects the contacts 53, 54 in the circuit of the pump 1, stopping the same. The stud 48 slides on the periphery of the cam 49 and at the end of one revolution passes over the notch 50 by sliding on the circular outer edge of the lever 51, which under the action of its spring 51' covers notch 50 when the stud 48 is pushed out of the notch. After the stud has moved beyond the lever 51, the knob 66 is turned in the opposite direction, so that stud 48 pushes back the projecting edge of the lever 51 placing the stud 48 over the notch 50. During the setting of the indicating mechanism to zero, the pump 1 is electrically disconnected and stopped. The same position of stud 48 is obtained when the nozzle handle 8 is on the hooked end of lever 46 during setting to zero.

Although the nozzle handle 8 may be unhooked from the lever 46 the latter cannot oscillate, the contact means 53, 54 cannot close and the pump 1 cannot start working since the rod 55 is held in its lower position by the arm 57, the presetting mechanism 11, 12, 13 being in the zero position. The operator then arranges the nozzle handle 8 at the place where he wishes to deliver the liquid.

The presetting mechanism 11, 12, 13 is then set by means of the knob 45. The rotation of the latter is transmitted, through the elements 44, 43, 42, 41 and 40 to the shaft 14 and through the latter to the drum 11. By allowing the latter to rotate through a sufficient number of revolutions, the drums 12 and 13 can be made to rotate by means of transmission devices of a known type, (cam with carry over stop 67, planet wheel 81 and pinion 82). When the number of units of liquid to be delivered appears behind the windows 84 of the casing 31, the rotation of the knob 45 is stopped.

The rotation of the drum or drums 11, 12, 13 causes rotation of the corresponding cams 15 in the direction of the arrow $f$ (Figure 2). If the arm 22 which constitutes one tooth of the comb 22, 23, 30, was in the notch 16 (this is the case when the numerals of the drums 11, 12, 13, appearing behind the windows 84 of the casing 31 are zeros and the arm 30 is in the notch of the cam 29), the arm 22 pushes back the bell crank lever 19 and moves along the inclined guiding edge 76. This has the effect of tipping the comb 22, 23, 30, and of pushing the arm 57 off the end of the rod 55. When the operator takes the nozzle from the hook end of the lever 46, the lever 46 can tilt under the action of spring 54' so that the stud 48 enters the notch 40, the contact means 53, 54, close and pump 1 starts working.

After leaving the notch 16, the lever 22 slides along the periphery of the cam 15 while the lever 19 turns in counterclockwise direction under the action of spring 20 until the lever 19 abuts against the abutment 21. In this position the lever 19 covers part of the notch 16 and projects beyond the guiding edge 76 in such a way that the open portion of the notch 16 is bounded at one side by the edge 17 and at the other side by the edge 18 of the lever 19. In this position the edge 18 is less inclined with respect to the radial direction of the cam 15 than the edge 76 so that the drop of the lever 22 into the notch 17 will be more rapid than if the lever 19 would not be provided, and consequently the exact operation of the apparatus is improved, while at the same time the duration of the period of discharge at reduced speed is shortened.

The tipping of the comb 22, 23, 30 effects, through members 58, 59, 60, 61 and 62, movement of the valve 10 away from its seat formed by the valve 9 against the action of spring 90 and of causing the opening of the bore 64 of the valve 9 which constitutes part of a shunt conduit formed, in addition thereto, by the chamber 69 and the conduit 68 in which the passage section can be controlled by a needle valve 72.

The rotation of the shaft 14 also causes rotation of the ratchet wheel 24, but cannot move the pawl 25 due to the non reversibility of the transmission 26, 27, so that the setting of the presetting mechanism cannot remove the indicating mechanism from its zero position.

The operator then opens the valve of the nozzle 8, which he holds in his hand, and the delivery begins only through the shunt conduit 68, 69, 64, the valve 9 being still closed.

*During delivery.*—Due to the flow through the conduit 68, 69, 64, the difference between the pressures on the two faces of the piston 70, associated with the main valve 9 increases. At a given moment, the valve 9 leaves its seat 85 and the liquid flows at high speed through the seat 85.

As the delivery proceeds, the metering element 4 drives the indicating mechanisms and particularly the shafts 79, 78. The rotation of the latter causes that of the pinions 39 and 38. That one of the pinions which gears with the pinion 67, drives, through the latter the shafts 35 and 28, the worm screw 27 and the worm wheel 26. The pawl 25, carried by the latter drives the ratchet wheel 24 and the shaft 14 in the direction of decreasing numerals of the drum 11 and, if need be, through the carry over devices 67, 81, 82, the drums 12 and 13.

*End of delivery.*—When the two drums 12 and 13 allow the numeral 0 to appear behind the window 84, and when the number indicated by the drum 11 is not 0 or 1, the comb formed by the levers 22, 23 and 30 is in a position as illustrated in Fig. 2, that is, the free end of the lever 22 is located on the cylindrical periphery of the cam 15 corresponding to the drum 11. The drum 11 continues therefore to rotate in a direction opposite to the direction indicated by the arrow *f*. When the tooth of the lever 22 arrives opposite the lever 19 it slides on the surfaces of the cam 15 and on the lever 19, which latter abuts with its edge against the pin 21. When the tooth of the lever arrives at the inclined surface edge 18 of the lever 19, the lever 22 rocks about its axis. This tipping will be gradual and will cause the valves 10 and 9 to move closer together, and, consequently a throttling of the shunt conduit 68, 69, 64. Therefore, the difference between the pressures obtaining on the two faces of the piston 70 will tend to decrease and the valve 9 to move towards the closure position, which has the effect of again increasing the flow through the derivation 68, 69, 64 and, consequently, to move back the valve 9 in an opposite direction. To a predetermined position of the valve 10 will correspond a position of the valve 9, at least when the latter is between the limiting positions of closure by impact on the seat 85 or of maximum aperture (determined by a stop, not shown). Thus, the displacements of the valve 10 are accompanied by displacements of the valve 9 in the same direction.

The main valve 9, follows the pilot valve 10. The guiding edge 18 is shaped in such a manner that the valve 9 passes from the position of complete aperture to the position of closure and that the valve 10 remains away from the valve 9.

When the arm or tooth 22 leaves the guiding edge 18 and falls into the notch 16, after sliding on the lever 19, the motion is limited by the tooth 30' striking against the edge of the dish formed by the cam 29. This motion then causes a sudden displacement of the valve 10 which, however, still remains away from the valve 9. The delivery then continues only through the conduit 68, 69, 64 at a sufficiently reduced speed not to cause the re-opening of the valve 9. When the notch of the dish 29 passes under the arm 30, i. e. when the amount of liquid effectively delivered and recorded by the indicating mechanism is a multiple of the measuring unit used for the calibration of the indicating mechanism, the arm 30 falls in the notch and the arms 22 finish their drop in the notches 16, the valve 10 being then seated on the valve 9. The shunt conduit 68, 69, 64 closes and the delivery stops. This final tipping of the comb 22, 23, 30 brings the arm 57 against the rod 55 which moves down and opens the contact means 53, 54, which causes the pump 1 to stop. The operator can then hang the nozzle 8 on the lever 46.

The above described apparatus offers numerous advantages with respect to existing apparatus, and particularly the following:

1. *Ease of installation.*—The presetting mechanism and its control elements, the main valve and the auxiliary valve and their control by the predetermining mechanism, the contacts controlling the pump and its control elements and the zero setting device are arranged in an assembly of casings 31—77—5 forming a block, which may be mounted conveniently on present apparatus comprising no predeterminator, with a minimum of modifications and adjustment.

Under such conditions, there is no excessive addition to the cost price of the apparatus comprising a price indicator without any presetting device, the use of which is becoming generalized and the construction of which is already fairly complex, since one is not obliged to build two different types of apparatus, according to whether they have a presetting device or not and it is sufficient to add the block of casings 31, 77, 5 on the production type apparatus having no presetting device.

2. *Accuracy of delivery at high speed.*—In present apparatus which also evaluate the amount of liquid in monetary units, it is necessary to provide a price indicator operating at high speed, in view of the unit price per litre.

The presetting mechanism which may be associated with this indicating mechanism should therefore be capable of operating at a very high speed.

The possibility of adapting, under such conditions, the presetting device to a price indicator requires a greater accuracy in the various phases of the stopping of the delivery. Present devices all offer a drawback from the latter standpoint, either because the speed of closure depends too much on the speed of the liquid flow or because the reactions it causes on the control rod are of a character capable of disturbing the operation of the presetting mechanism.

This difficulty is obviated here by the use of a valve 9 the position of which is linked with that of an auxiliary valve 10 which is brought mechanically to the desired position and the reactions of which on the control mechanism are small.

3. *Pump control.*—In present apparatus, there exist several contact means arranged in series on the control circuit of the pump and actuated each by the various mechanisms which have to control the operation of the pump (presetting mechanism, nozzle lever and zero setting).

In the present apparatus, a single contact means 53, 54 is controlled by these various pieces of equipment.

What is claimed is:

1. A fluid dispensing and metering apparatus comprising, in combination, fluid conduit means; a main valve arranged in said fluid conduit means; a presetting device movable between a zero position and a preset position; actuating means connecting said presetting device to said main valve for opening the same durig movement to a preset position; said presetting device including a rotatable shaft, at least one cam fixedly mounted on said shaft, said cam being formed with a notch in the perimeter thereof having a guide edge, at least one pivotally mounted arm slidably engaging said cam and actuated by the same to perform a pivoting movement, at least one lever fixedly connected to said arm for pivoting the same, actuating means connecting said lever with said main valve, manually operated means for turning said shaft and said cam so that sliding of said arm on said cam effects pivoting of said lever in one direction and closing of said main valve in said zero position, and opening of said main valve in a preset position, a spring-loaded member pivotally secured to said cam movable between a position covering said notch and another position opening said notch, said member permitting in said covering position sliding of said arm over said notch during rotation of said cam in one direction, said arm pivoting said member to said opening position during rotation of said cam in opposite direction so as to enter said notch and to effect pivoting of said arm and of said lever in said opposite direction and closing of said main valve in said zero position; indicating means connected to and driven by said metering means, and including a shaft member extending normal to said shaft of said presetting device, a dish-shaped cam means secured to said shaft member and formed with at least one notch and another arm fixedly connected to said one arm for pivoting with the same and having a free end cooperating with said dish-shaped cam means, said notch of said dish-shaped cam means passing under said free end of said other arm at intervals corresponding to the dispensing of a predetermined amount of fluid permitting said other arm to pivot into said notch, and said one arm to pivot in said opposite direction.

2. A fluid dispensing and metering apparatus as claimed in claim 1 wherein said notches are shaped in such manner that the entering of said one arm into said notch of said cam depends on the entering of said other arm into said notch in said dish-shaped cam means so that during said entering said main valve is partly closed, the amount of fluid thus dispensed being smaller than the amount of fluid dispensed when said main valve is opened.

3. A fluid dispensing and metering apparatus comprising, in combination, a main distributing conduit; a valve means controlling the passage of fluid through said conduit; a presetting device; means for moving said presetting device from a zero position to a preset position corresponding to the quantity of fluid to be delivered; means connecting said presetting device to said valve means and opening said valve means during movement of said presetting device to a preset position; a metering device in said main conduit means and actuated by the delivered fluid, said metering device being connected to said presetting device and moving the same from said preset position into the zero position during fluid delivery; indicating means actuated by said metering device; a shaft; means for resetting said indicating means from indicating position to zero position connected to and actuated by said shaft; a circular cam formed with a notch on its periphery and mounted on said shaft; a member turnably mounted on said shaft adjacent said cam, said member having a length slightly greater than the radius of said circular cam; resilient means attached to said cam and to said member and tending to move said member into a position covering said notch; a pivoted lever; a stud secured to said lever and located opposite said notch when said cam is in a position corresponding to the zero position of said indicating means, and located opposite said circular periphery of said cam when said indicating means are not in zero position; a pump for circulating fluid through said main conduit means; pump actuating means movable between a pump starting position and a pump stopping position; a connecting member secured to said pump actuating means and moving with the same, said connecting member being connected to said lever; spring means urging said pump actuating means into said pump starting position and also urging said lever to pivot into a position in which said stud is located on the periphery of said cam and tends to drop into said notch; a flexible hose communicating with said main conduit means; means for attaching said hose to said lever, the weight of said hose tending to pivot said lever into a position in which said stud is located outside of said notch; and means connected to and actuated by said presetting device and holding said connecting member in a position corresponding to said pump stopping position of said pump actuating means when said presetting device is in zero position.

4. An apparatus as claimed in claim 3 in which said presetting device and said indicating means are rotatable and have axes of rotation perpendicular to each other; and including transmission means connecting said presetting device to said metering device, said transmission means including another cam having a peripheral edge formed with a notch; a lever arm actuated by said presetting device and having a portion sliding on said peripheral edge of said other cam during turning of the same and tending to drop into said notch, said lever arm being connected to said valve means for opening the same when said portion is on said peripheral edge.

References Cited in the file of this patent

UNITED STATES PATENTS

| 2,012,563 | Hazard | Aug. 27, 1935 |
| 2,057,333 | Guibert | Oct. 13, 1936 |
| 2,302,529 | Cornell et al. | Nov. 17, 1942 |
| 2,336,383 | Alexander | Dec. 7, 1943 |
| 2,358,712 | Hinds | Sept. 19, 1944 |
| 2,358,771 | Hinds | Sept. 19, 1944 |
| 2,527,703 | Carbonaro | Oct. 31, 1950 |
| 2,590,440 | Meyer et al. | Mar. 25, 1952 |

FOREIGN PATENTS

| 571,827 | Great Britain | Sept. 11, 1945 |